(12) United States Patent
Wu et al.

(10) Patent No.: US 9,715,105 B2
(45) Date of Patent: Jul. 25, 2017

(54) LIGHT SWITCHING MODULE

(71) Applicant: BENQ MATERIALS CORPORATION, Taoyuan County (TW)

(72) Inventors: Lung-Hai Wu, Taoyuan (TW); Cyun-Tai Hong, New Taipei (TW)

(73) Assignee: BENQ MATERIALS CORPORATION, Taoyuan County (TW)

( * ) Notice: Subject to any disclaimer, the term of this patent is extended or adjusted under 35 U.S.C. 154(b) by 24 days.

(21) Appl. No.: 14/584,295

(22) Filed: Dec. 29, 2014

(65) Prior Publication Data

US 2015/0219916 A1    Aug. 6, 2015

(30) Foreign Application Priority Data

Feb. 6, 2014 (TW) .............................. 103103913 A

(51) Int. Cl.
G02B 27/28    (2006.01)
G02B 26/02    (2006.01)
G02B 3/00     (2006.01)
G02B 5/30     (2006.01)

(52) U.S. Cl.
CPC .......... *G02B 26/023* (2013.01); *G02B 3/0062* (2013.01); *G02B 5/3016* (2013.01); *G02B 5/3083* (2013.01)

(58) Field of Classification Search
CPC ...... G02B 5/30; G02B 5/3033; G02B 5/3083; G02B 27/28; G02B 27/286; G02B 27/283; G02B 27/281; G02B 26/02; G02B 26/023; G02B 3/0062; G02B 5/3016; G02F 1/13473; G02F 1/1334; G02F 1/133509; G02F 1/133784; A61F 2/1618; G01J 3/14; C23C 16/56

USPC .......... 359/486.01, 486.02, 489.01, 489.06, 359/489.07, 489.15, 489.18, 490.03; 349/16, 18, 104, 126; 427/532, 553, 554, 427/558

See application file for complete search history.

(56) References Cited

U.S. PATENT DOCUMENTS

| | | | |
|---|---|---|---|
| 2007/0109400 A1* | 5/2007 | Woodgate | G02B 27/2214 348/47 |
| 2010/0053751 A1* | 3/2010 | McLeod | G02B 5/3083 359/485.05 |
| 2012/0169950 A1* | 7/2012 | Tatzel | G02B 5/3083 349/18 |

OTHER PUBLICATIONS

Mattoussi et al "Refractive Indices Dispersion and Order of Lyotropic Liquid Crystal Polymers"; Macromolecules 1992, 25, 2860-2868.*

* cited by examiner

*Primary Examiner* — Jie Lei
(74) *Attorney, Agent, or Firm* — Muncy, Geissler, Olds & Lowe, P.C.

(57) ABSTRACT

A light switching module including a first refractive element, a second refractive element and a shifting device. The first refractive element and the second refractive element include substrates with a plurality of micro-lens structures, patterned retardation microstructures disposed on the plurality of micro-lens structures and birefringent layers on the patterned retardation microstructures. Therefore, the birefringent layers have different optical axis regions. The shifting device can adjust the relative position of the first refractive element and the second refractive element to switch penetrating or refracting of incident light and to change the light switching module to transparent state or opaque state.

10 Claims, 4 Drawing Sheets

LIGHT SWITCHING MODULE

CROSS-REFERENCE TO RELATED APPLICATION

This application claims the benefit of Taiwan Patent Application No. 103103913, filed on Feb. 6, 2014, in the Taiwan Intellectual Property Office, the disclosure of which is incorporated herein in its entirety by reference.

BACKGROUND

Technical Field

The present invention relates to a light switching module for switching the state of the incident light to transparent state or opaque state according to the principle of light refraction.

Description of Related Art

With the developments of the smart glass and smart window, various applications of light adjusting device or light switching device are thereby on the increase. The technical principle of conventional electronically controlled liquid crystal type smart windows is to sandwich polymer-dispersed liquid crystals between two sheets of glass, and to control the alignment directions of the liquid crystals of ordered or disordered arrangement with electric field for adjusting the transmittance. The polymer-dispersed liquid crystals are liquid crystal droplets dispersed into a polymer matrix and aligned in a continuous power supply to maintain a transparent state; however, it usually has some problems of uneven dispersion of the liquid crystals, and power consumption under continuous power supply.

SUMMARY OF THE INVENTION

Accordingly, the present disclosure is to provide a novel, inventive and useful light switching module for switching the transmitting light to transparent state or opaque state.

An aspect of the present disclosure is to provide a light switching module comprising a first refractive element comprising a first substrate with a first refractive index comprising a plurality of first micro-lens structures on a side thereof; a first patterned retardation microstructure disposed on the plurality of first micro-lens structures; and a first birefringent layer disposed on the first patterned retardation microstructure for forming a first optical axis region with a first optical axis and a second optical axis region with a second optical axis; wherein the first optical axis region has an extraordinary refractive index in the direction parallel to the first optical axis and an ordinary refractive index in the direction perpendicular to the first optical axis; the second optical axis region has an extraordinary refractive index in the direction parallel to the second optical axis and an ordinary refractive index in the direction perpendicular to the second optical axis; wherein the first optical axis region and the second optical axis region are interleaved arrangement; the first optical axis and the second axis are perpendicular to each other; a second refractive element adjacent to a side of the first refractive element comprising a second substrate with a second refractive index comprising a plurality of second micro-lens structures on a side thereof; a second patterned retardation microstructure disposed on the plurality of second micro-lens structures; and a second birefringent layer disposed on the second patterned retardation microstructure for forming a third optical axis region with a third optical axis and a fourth optical axis region with a fourth optical axis; wherein the third optical axis region has an extraordinary refractive index in the direction parallel to the third optical axis and an ordinary refractive index in the direction perpendicular to the third optical axis; the fourth optical axis region has an extraordinary refractive index in the direction parallel to the fourth optical axis and an ordinary refractive index in the direction perpendicular to the fourth optical axis; wherein the third optical axis region and the fourth optical axis region are interleaved arrangement; the third optical axis and the fourth axis are perpendicular to each other; and a shifting means connected to the first refractive element or the second refractive element for adjusting the relative position of the first refractive element and the second refractive element; wherein the first refractive index of the first substrate is the same as one of the extraordinary refractive index and the ordinary refractive index of the first birefringent layer; the second refractive index of the second substrate is the same as one of the extraordinary refractive index and the ordinary refractive index of the second birefringent layer; one of the first optical axis and the second optical axis is parallel to one of the third optical axis and the fourth optical axis.

In a light switching module of a preferred embodiment of the present invention, the curvatures of the micro-lens of the first micro-lens structures of the first refractive element and the corresponding second micro-lens structures of the second refractive element are the same.

In a light switching module of another preferred embodiment of the present invention, each of the micro-lens of the first micro-lens structures and the second micro-lens structures is concave-lens or convex-lens.

In a light switching module of another preferred embodiment of the present invention, the plurality of first micro-lens structures and the plurality of second micro-lens structures are continuously or discontinuously arranged in one-dimension or two-dimension.

In a light switching module of another preferred embodiment of the present invention, wherein the areas of the first optical axis region and the second optical axis region of the first birefringent layer and the areas of the third optical axis region and the fourth optical axis region of the second birefringent layer are the same.

In a light switching module of another preferred embodiment of the present invention, when the directions of the first optical axis of the first optical axis region and the second optical axis of the second optical axis region and the directions of the respectively corresponding third optical axis of the third optical axis region and the fourth optical axis of the fourth optical axis region are all parallel to each other, the light switching module is in transparent state; when the directions of the first optical axis of the first optical axis region and the second optical axis of the second optical axis region and the directions of the respectively corresponding third optical axis of the third optical axis region and the fourth optical axis of the fourth optical axis region are all perpendicular to each other, the light switching module is in opaque state.

In a light switching module of another preferred embodiment of the present invention, the pitch of the first micro-lens structures is in a range of 0 μm to 1000 μm; the pitch of the second micro-lens structures is in a range of 0 μm to 1000 μm; the width of each of the first micro-lens structures is in a range of 10 μm to 1000 μm; the width of each of the second micro-lens structures is in a range of 10 μm to 1000 μm; the height of each of the first micro-lens structures is in a range of 10 μm to 1000 μm; the height of each of the second micro-lens structures is in a range of 10 μm to 1000 μm.

In a light switching module of another preferred embodiment of the present invention, the material of the birefringent layer is liquid crystal, birefringent crystal or birefringent resin.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 2-1 and FIG. 2-2 are perspective views illustrating the principle of transparent state and opaque state of the light switching module of an embodiment of the present invention;

DESCRIPTION OF EMBODIMENTS OF THE INVENTION

To describe the technical features of the present invention in greater detail, preferred embodiments of the present invention are provided below along with the accompanied drawings accordingly as follows. The various embodiments will be described in detail with reference to the accompanying drawings. References made to particular examples and implementations are for illustrative purposes, and are not intended to limit the scope of the invention or the claims.

The light switching module of the present invention will be described along with the accompanied drawings accordingly as follows. It is appreciated that the same reference numbers will be used throughout the drawings to refer to the same or like parts.

Figure 1:
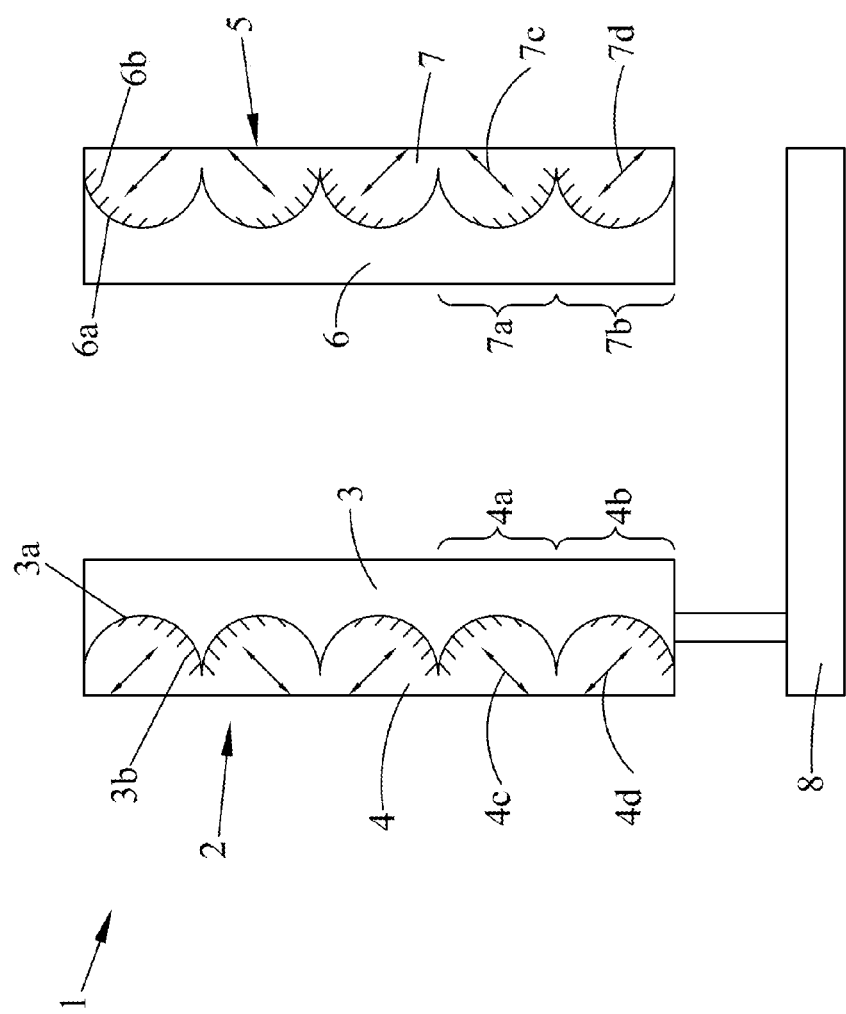
FIG. 1 is a perspective view of the light switching module of an aspect of the present invention.

Referring to FIG. 1, an aspect of the present disclosure is to provide a light switching module 1 comprising a first refractive element 2 comprising a first substrate 3 with a first refractive index comprising a plurality of first micro-lens structures 3*a* on a side thereof; a first patterned retardation microstructure 3*b* disposed on the plurality of first micro-lens structures 3*a*; and a first birefringent layer 4 disposed on the first patterned retardation microstructure 3*b* for forming a first optical axis region 4*a* with a first optical axis 4*c* and a second optical axis region 4*b* with a second optical axis 4*d*; wherein the first optical axis region 4*a* has an extraordinary refractive index in the direction parallel to the first optical axis 4*c* and an ordinary refractive index in the direction perpendicular to the first optical axis 4*c*; the second optical axis region 4*b* has an extraordinary refractive index in the direction parallel to the second optical axis 4*d* and an ordinary refractive index in the direction perpendicular to the second optical axis 4*d*; wherein the first optical axis region 4*a* and the second optical axis region 4*b* are interleaved arrangement; the first optical axis 4*c* and the second axis 4*d* are perpendicular to each other; a second refractive element 5 adjacent to a side of the first refractive element 2 comprising a second substrate 6 with a second refractive index comprising a plurality of second micro-lens structures 6*a* on a side thereof; a second patterned retardation microstructure 6*b* disposed on the plurality of second micro-lens structures 6*a*; and a second birefringent layer 7 disposed on the second patterned retardation microstructure 6*b* for forming a third optical axis region 7*a* with a third optical axis 7*c* and a fourth optical axis region 7*b* with a fourth optical axis 7*d*; wherein the third optical axis region 7*a* has an extraordinary refractive index in the direction parallel to the third optical axis 7*c* and an ordinary refractive index in the direction perpendicular to the third optical axis 7*c*; the fourth optical axis region 7*b* has an extraordinary refractive index in the direction parallel to the fourth optical axis 7*d* and an ordinary refractive index in the direction perpendicular to the fourth optical axis 7*d*; wherein the third optical axis region 7*a* and the fourth optical axis region 7*b* are interleaved arrangement; the third optical axis 7*c* and the fourth optical axis 7*d* are perpendicular to each other; and a shifting means 8 connected to the first refractive element 2 or the second refractive element 5 for adjusting the relative position of the first refractive element 2 and the second refractive element 5; wherein the first refractive index of the first substrate 3 is the same as one of the extraordinary refractive index and the ordinary refractive index of the first birefringent layer 4; the second refractive index of the second substrate 6 is the same as one of the extraordinary refractive index and the ordinary refractive index of the second birefringent layer 7; one of the first optical axis 4*c* and the second optical axis 4*d* is parallel to one of the third optical axis 7*c* and the fourth optical axis 7*d*.

In a light switching module of a preferred embodiment of the present invention, the absolute value of radius of curvature of the micro-lens of the first micro-lens structures of the first refractive element and the corresponding second micro-lens structures of the second refractive element are the same; therefore, each of the micro-lenses can be concave-lens or convex-lens of same curvature.

In a light switching module of another preferred embodiment of the present invention, the plurality of first micro-lens structures and the plurality of second micro-lens structures are continuously or discontinuously arranged in one-dimension or two-dimension for enhancing the effect and uniformity of the opaque state of the light switching module with incident light in different directions.

In a light switching module of another preferred embodiment of the present invention, wherein the areas of the first optical axis region and the second optical axis region of the first birefringent layer and the areas of the third optical axis region and the fourth optical axis region of the second birefringent layer are the same.

Figures 1, 2:
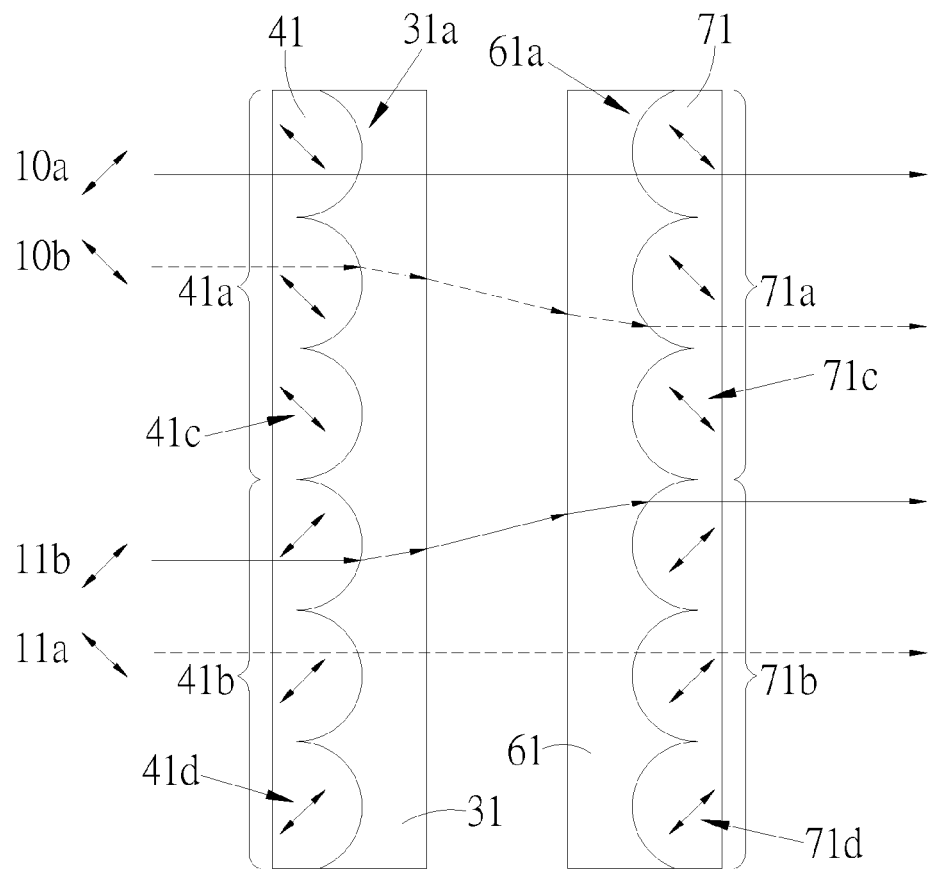
Figure 2:
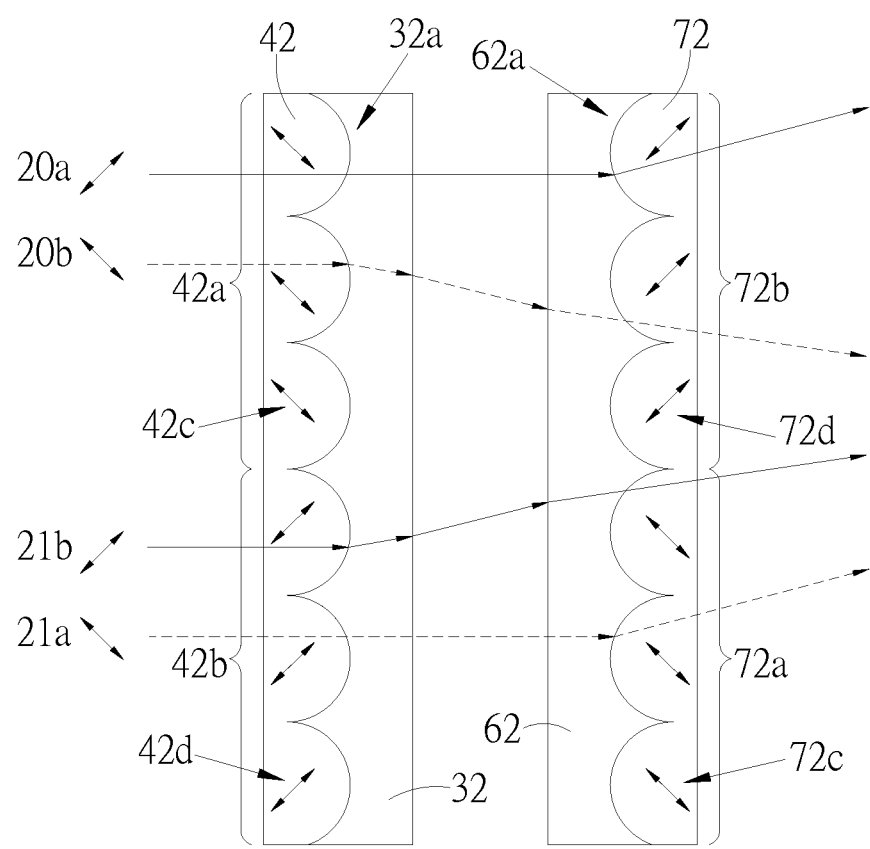

In a light switching module of another preferred embodiment of the present invention, as shown in FIG. 2-1, the first birefringent layer 41 has a first optical axis region 41*a* and a second optical axis region 41*b* in the presence of a first patterned retardation microstructure (not shown in the figure); the second birefringent layer 71 has a third optical axis region 71*a* and a fourth optical axis region 71*b* in the presence of a second patterned retardation microstructure (not shown in the figure); the incident light can be considered as combined light of two directional component; in this schematic, incident light component 10*a* is perpendicular to the first optical axis 41*c* of the first optical axis region 41*a* of the first birefringent layer 41; incident light component 10*b* is parallel to the first optical axis 41*c* of the first optical axis region 41*a* of the first birefringent layer 41; incident light component 11*a* is perpendicular to the second optical axis 41*d* of the second optical axis region 41*b* of the first birefringent layer 41; incident light component 11*b* is parallel to the second optical axis 41*d* of the second optical axis region 41*b* of the first birefringent layer 41; in a condition of that the first refractive index of the first substrate 31 and the ordinary refractive index of the first birefringent layer 41 are the same, and the second refractive index of the second substrate 61 and the ordinary refractive index of the second birefringent layer 71 are the same, and the directions of the first optical axis 41c of the first optical axis region 41a and the directions of the corresponding third optical axis 71c of the third optical axis region 71a and the second optical axis 41d of the second optical axis region 41b and the corresponding fourth optical axis 71d of the fourth optical axis region 71b are respectively parallel to each other, the incident component 10a ` 11a can induce the same ordinary refractive index of the first birefringent layer 41 and the second birefringent layer 71, and therefore, the substrate and the birefringent layer are the same media to the incident light component 10a ` 11a, and do not occur refraction phenomenon at the interface; accordingly, the incident light component 10a ` 11a can directly pass through the light switching module; as for the incident light component 10b ` 11b, the incident light component 10b ` 11b can induce the same extraordinary refractive index of the first birefringent layer 41 and the second birefringent layer 71, and therefore, the substrate and the birefringent layer are the different media to the incident light component 10b ` 11b, and occur refraction phenomenon at the interface; however, the direction of the incident light component 10b ` 11b can be adjusted to the original direction with the first micro-lenses structures 31a and the second micro-lens structures 61a of same curvature; accordingly, the light switching module is in transparent state.

As shown in FIG. 2-2, the first birefringent layer 42 has a first optical axis region 42a and a second optical axis region 42b in the presence of a first patterned retardation microstructure (not shown in the figure); the second birefringent layer 72 has a third optical axis region 72a and a fourth optical axis region 72b in the presence of a second patterned retardation microstructure (not shown in the figure); the incident light can still be considered as combined light of two directional component; in this schematic, incident light component 20a is perpendicular to the first optical axis 42c of the first optical axis region 42a of the first birefringent layer 42; incident light component 20b is parallel to the first optical axis 42c of the first optical axis region 42a of the first birefringent layer 42; incident light component 21a is perpendicular to the second optical axis 42d of the second optical axis region 42b of the first birefringent layer 42; incident light component 21b is parallel to the second optical axis 42d of the second optical axis region 42b of the first birefringent layer 42; in a condition of that the first refractive index of the first substrate 32 and the ordinary refractive index of the first birefringent layer 42 are the same, and the second refractive index of the second substrate 62 and the ordinary refractive index of the second birefringent layer 72 are the same, and the directions of the first optical axis 42c of the first optical axis region 42a and the directions of the corresponding fourth optical axis 72d of the fourth optical axis region 72b and the second optical axis 42d of the second optical axis region 42b and the corresponding third optical axis 72c of the third optical axis region 72a are respectively perpendicular to each other, the incident light component 20a ` 21a can induce the ordinary refractive index of the first birefringent layer 42 and the extraordinary refractive index of the second birefringent layer 72, and therefore, the second substrate 62 and the second birefringent layer 72 are the different media to the incident light component 20a ` 21a, and occur refraction phenomenon at the interface; accordingly, the incident light component 20a ` 21a cannot directly pass through the light switching module; as for the incident light component 20b ` 21b, the incident light component 20b ` 21b can induce the extraordinary refractive index of the first birefringent layer 42 and the ordinary refractive index of the second birefringent layer 72, and therefore, the first substrate 32 and the first birefringent layer 42 are the different media to the incident light component 20b ` 21b, and occur refraction phenomenon at the interface, and cannot directly pass through the light switching module; accordingly, the light switching module is in opaque state.

Figure 3:
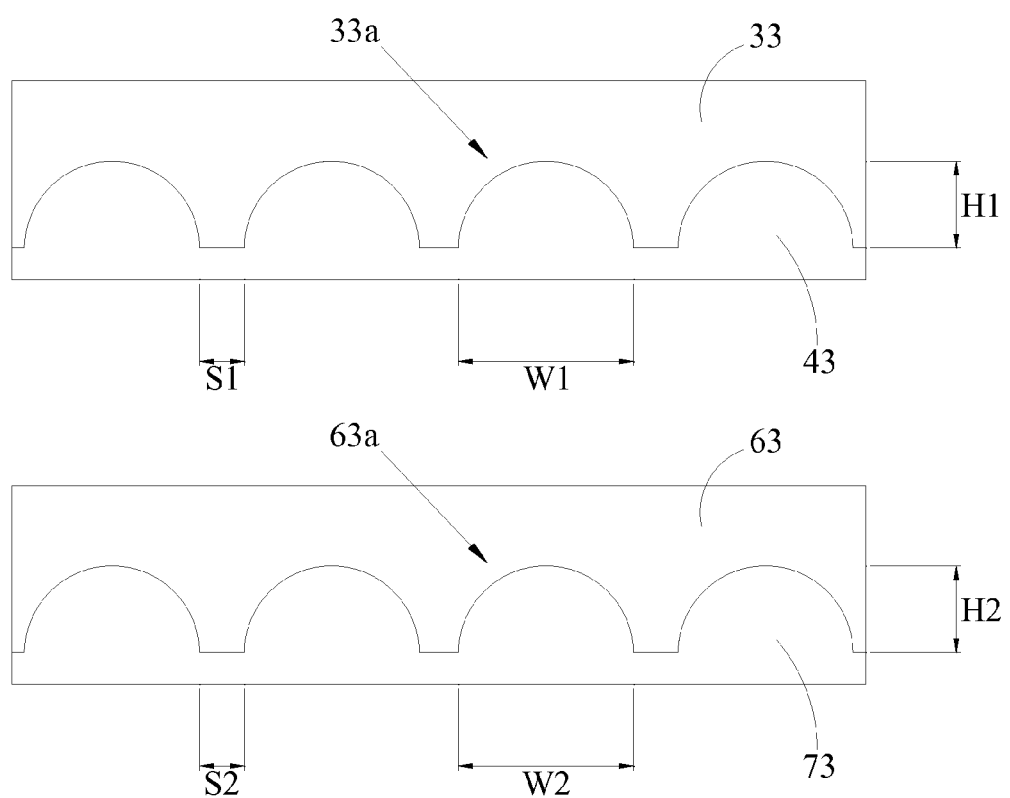
FIG. 3 is a perspective view illustrating the first refractive element and the second refractive element of the light switching module of another embodiment of the present invention.

Referring to FIG. 3, in a light switching module of another preferred embodiment of the present invention, the pitch S1 of the first micro-lens structures 33a between the first substrate 33 and the first birefringent layer 43 is in a range of 0 μm to 1000 μm; the pitch S2 of the second micro-lens structures 63a between the first substrate 63 and the first birefringent layer 73 is in a range of 0 μm to 1000 μm; the width W1 of each of the first micro-lens structures 33a is in a range of 10 μm to 1000 μm; the width W2 of each of the second micro-lens structures 63a is in a range of 10 μm to 1000 μm; the height H1 of each of the first micro-lens structures 33a is in a range of 10 μm to 1000 μm; the height H2 of each of the second micro-lens structures 63a is in a range of 10 μm to 1000 μm.

In a light switching module of another preferred embodiment of the present invention, the material of the birefringent layer is liquid crystal, birefringent crystal or birefringent resin.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A light switching module comprising:
 a first refractive element comprising
  a first substrate with a first refractive index comprising a plurality of first micro-lens structures on a side thereof;
  a first patterned retardation microstructure layer disposed on the plurality of first micro-lens structures; and
  a first birefringent layer disposed on the first patterned retardation microstructure for forming a first optical axis region with a first optical axis and a second optical axis region with a second optical axis; wherein the first optical axis region has an extraordinary refractive index in the direction parallel to the first optical axis and an ordinary refractive index in the direction perpendicular to the first optical axis; the second optical axis region has an extraordinary refractive index in the direction parallel to the second optical axis and an ordinary refractive index in the direction perpendicular to the second optical axis, wherein the first birefringent layer has a complementary surface fitted together with the plurality of first micro-lens structures;

wherein the first optical axis region and the second optical axis region are interleaved arrangement; the first optical axis and the second axis are perpendicular to each other;

a second refractive element adjacent to a side of the first refractive element comprising
- a second substrate with a second refractive index comprising a plurality of second micro-lens structures on a side thereof;
- a second patterned retardation microstructure disposed on the plurality of second micro-lens structures; and
- a second birefringent layer disposed on the second patterned retardation microstructure for forming a third optical axis region with a third optical axis and a fourth optical axis region with a fourth optical axis; wherein the third optical axis region has an extraordinary refractive index in the direction parallel to the third optical axis and an ordinary refractive index in the direction perpendicular to the third optical axis, wherein the second birefringent layer has a complementary surface fitted together with the plurality of second micro-lens structures; the fourth optical axis region has an extraordinary refractive index in the direction parallel to the fourth optical axis and an ordinary refractive index in the direction perpendicular to the fourth optical axis;

wherein the third optical axis region and the fourth optical axis region are interleaved arrangement; the third optical axis and the fourth axis are perpendicular to each other; and a shifting means connected to the first refractive element or the second refractive element for adjusting the relative position of the first refractive element and the second refractive element;

wherein the first refractive index of the first substrate is the same as one of the extraordinary refractive index and the ordinary refractive index of the first birefringent layer; the second refractive index of the second substrate is the same as one of the extraordinary refractive index and the ordinary refractive index of the second birefringent layer; one of the first optical axis and the second optical axis is parallel to one of the third optical axis and the fourth optical axis.

2. The light switching module according to claim 1, wherein the curvatures of the micro-lens of the first micro-lens structures of the first refractive element and the corresponding second micro-lens structures of the second refractive element are the same.

3. The light switching module according to claim 2, wherein each of the micro-lens of the first micro-lens structures and the second micro-lens structures is concave-lens or convex-lens.

4. The light switching module according to claim 1, wherein the plurality of first micro-lens structures and the plurality of second micro-lens structures are continuously or discontinuously arranged in one-dimension or two-dimension.

5. The light switching module according to claim 1, wherein areas of the first optical axis region and the second optical axis region of the first birefringent layer and areas of the third optical axis region and the fourth optical axis region of the second birefringent layer are the same.

6. The light switching module according to claim 1, when the directions of the first optical axis of the first optical axis region and the second optical axis of the second optical axis region and the directions of the respectively corresponding third optical axis of the third optical axis region and the fourth optical axis of the fourth optical axis region are all parallel to each other, the light switching module is in transparent state; when the directions of the first optical axis of the first optical axis region and the second optical axis of the second optical axis region and the directions of the respectively corresponding third optical axis of the third optical axis region and the fourth optical axis of the fourth optical axis region are all perpendicular to each other, the light switching module is in opaque state.

7. The light switching module according to claim 1, wherein intervals between adjacent first micro-lens structures is in a range of 0 mm to 1000 mm; and intervals between adjacent second micro-lens structures is in a range of 0 mm to 1000 mm.

8. The light switching module according to claim 1, wherein the width of each of the first micro-lens structures is in a range of 10 mm to 1000 mm; and the width of each of the second micro-lens structures is in a range of 10 mm to 1000 mm.

9. The light switching module according to claim 1, wherein the height of each of the first micro-lens structures is in a range of 10 mm to 1000 mm; and the height of each of the second micro-lens structures is in a range of 10 mm to 1000 mm.

10. The light switching module according to claim 1, wherein the material of the birefringent layer is liquid crystal, birefringent crystal or birefringent resin.

* * * * *